July 7, 1970   KIYOYASU WAKE   3,518,855
MAGNETICALLY ACTUATED TUMBLER LOCK
Original Filed March 30, 1967   7 Sheets-Sheet 1

INVENTOR.
KIYOYASU WAKE
BY
ATTORNEYS

United States Patent Office 3,518,855
Patented July 7, 1970

3,518,855
MAGNETICALLY ACTUATED TUMBLER LOCK
Kiyoyasu Wake, Tokyo, Japan, assignor of
one-half to Fuji Manufacturing Co., Ltd.
Original application Mar. 30, 1967, Ser. No. 627,092, now
Patent No. 3,393,541, dated July 23, 1968. Divided and
this application June 21, 1968, Ser. No. 738,973
Claims priority, application Japan, Aug. 26, 1966,
41/55,822; Jan. 10, 1967, 42/1,576
Int. Cl. E05b 47/00
U.S. Cl. 70—276                               2 Claims

ABSTRACT OF THE DISCLOSURE

The combination of a lock and a key wherein at least one permanent magnet piece is provided in the key and, also, at least one permanent magnet piece is provided in the lock which is adapted to cooperate with the magnet piece in the key so as to be moved to unlock the lock by the permanent magnet piece in the key only when the proper key is inserted properly in the lock by the action of attraction or repulsion force acting between the magnet pieces in the lock and the key depending upon the orientation of the polarity of the permanent magnet pieces. An auixilary permanent magnet is positioned in the lock to magnetically hold the movable magnet piece in the lock in its locking position until the magnetic attraction force of the auxiliary magnet is overcome by the magnetic force of the permanent magnet piece provided in the key to move the movable magnet piece to its unlocking position.

CROSS-REFERENCE TO RELATED APPLICATION

This application is a divisional application of the copending parent application by the same inventor entitled Magnetically Actuated Tumbler Lock, Ser. No. 627,092, filed Mar. 30, 1967, now U.S. Pat. 3,393,541.

BACKGROUND OF THE INVENTION

The present invention relates to improvement in a lock and a key, and more particularly to improvement in a magnet tumbler lock and a key therefor in which a plurality of permanent magnet pieces are movably provided in the lock which permanent magnet pieces are attracted or repelled by the corresponding permanent magnet pieces provided in the key when it is inserted into said lock so as to move said first mentioned permanent magnet pieces in the lock out of their normal locking positions so that the lock is unlocked.

Prior art locks and keys therefor are elaborately made in the forms of so-called cylinder locks including pin-tumbler locks, disc-tumbler locks and lever-tumbler locks which can be unlocked only under the condition that several of the pins, discs or levers built in the locks are moved to specific positions so as to permit the lock to be operated depending upon the height of notches in the edge of each of the keys specifically designed to be used with the specific locks, respectively, to unlock them by inserting the keys in the locks. A plurality of key changes (keys having different unlocking characteristics) can be provided by changing the height of the notches and the arrangement thereof in the edge of the keys so as to unlock specific locks. Or, a master key which has the unlocking characteristics corresponding to those of a predetermined number of keys can unlock a group of locks to be used with said predetermined number of keys, respectively.

However, these locks of the prior art have serious disadvantages. One is that they can be "picked"—that is, they can be unlocked by an improper person using some suitable tools or wires. Further, the key of such a lock cannot be easily and smoothly inserted into the lock because of the notches in the edge of the key. Another disadvantage is that the locks might be unlocked by improper keys, if the keys have notches in the edge thereof approximately corresponding to those of the proper keys in the height and arrangement of the notches.

Also, magnet tumbler locks have been developed wherein the pins of pin-tumbler locks are made of magnetizable metal and the keys to be used therewith are provided with a plurality of permanent magnet pieces embedded therein at positions corresponding to the pins, respectively, instead of providing notches in the edge of each of the keys serving as unlocking means, said permanent magnet pieces in the keys being adapted to attract said magnetizable pins in the locks, respectively, when the keys are inserted into the locks thereby moving the pins to unlocking positions so that the locks are unlocked by turning the keys.

In order to return the magnetizable pins in said pin-tumbler locks or magnetic tumbler locks from their unlocking positions to the locking positions, the action of spring means is usually utilized. However, spring means has disadvantages in that it tends to be broken by fatigue or time-worn failure.

The above disadvantages are overcome by the present invention by providing at least one permanent magnet piece in the key which is adapted to cooperate with at least one permanent magnet piece provided in the lock only when the proper key is inserted in the lock so that the permanent magnet piece in the lock is moved to its unlocking position by the action of the attraction or repulsion force acting between the permanent magnet pieces of the lock and the key if the orientation of the polarity of the permanent magnet pieces is appropriately selected.

SUMMARY OF THE INVENTION

The magnet tumbler lock in accordance with the invention overcomes the defects inherent in the prior art tumbler lock.

An object of the present invention is, therefore, to provide a tumbler lock which avoids the above-mentioned disadvantages of the prior art locks.

Another object of the present invention is to provide a magnet tumbler lock acting like the prior art mechanical pin-tumbler lock, disc-tumbler lock and lever-tumbler lock, said magnet tumbler utilizing not only magnetic attraction force but also repulsion force acting between the permanent magnet pieces provided both in the lock and the key to be used therewith when the key is inserted in the lock so as to move the magnet pieces in the lock to proper unlocking positions only when the proper key specifically designed to be used with said lock is inserted into the lock.

A further object of the present invention is to provide a tumbler lock in which the above-mentioned magnet lock construction is utilized in combination with the conventional pin-tumbler, disc-tumbler or lever-tumbler construction so that the number of key changes (different unlocking characteristics) may be greatly increased.

BRIEF DESCRIPTION OF THE DRAWING

The other objects and advantages of the present invention will be apparent by reading the following description of the preferred embodiments thereof in connection with the accompanying drawings, wherein.

DESCRIPTION OF THE PREFERRED EMBODIMENTS

Preferred embodiments of the present invention will be set forth in detail hereinafter.

Figure 1:
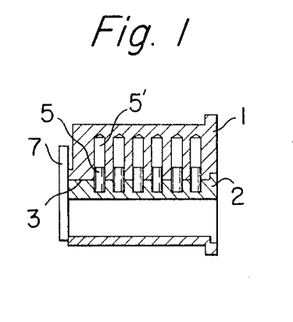
FIG. 1 shows a longitudinal sectional view of the first embodiment of the magnet lock in accordance with the present invention.
Figures 2, 4, 5A:
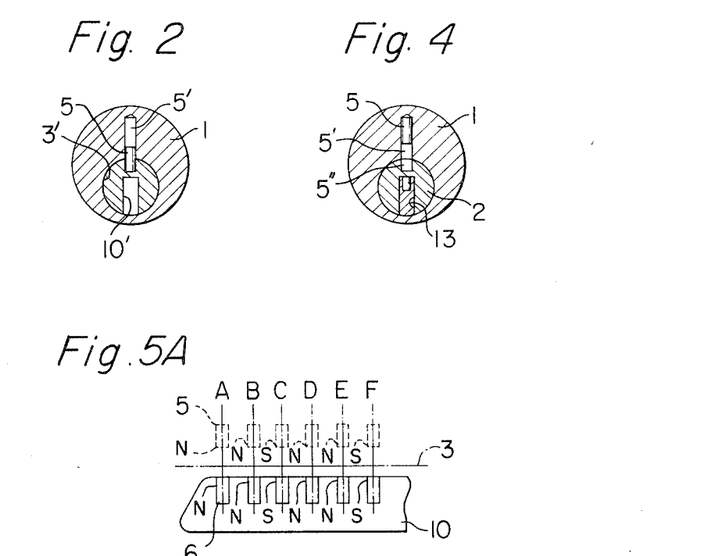
FIG. 2 shows a cross sectional view taken in the plane perpendicular to that of FIG. 1.
FIG. 4 shows a cross sectional view similar to FIG. 2 but showing the lock in unlocked state by inserting the key into the lock.
FIG. 5A is a diagrammatic view showing how the pins of the lock in accordance with the present invention are actuated to assume their unlocked positions by the proper key to be used with the lock.
Figure 3:
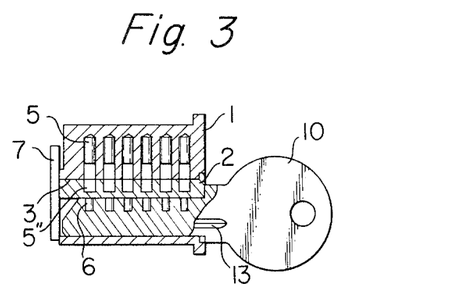
FIG. 3 shows a longitudinal sectional view similar to FIG. 1 but showing the lock in unlocking position by inserting the key to be properly used with the lock.
Figure 5B:
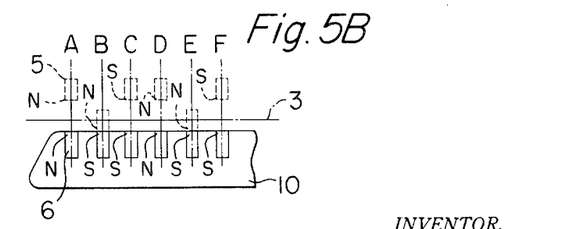
FIG. 5B is also a diagrammatic view similar to FIG. 5A but showing how the pins are actuated by the improper key preventing the lock from being actuated to assume the unlocked position.

Referring now to FIG. 1, showing the first embodiment of the present invention, a plurality of holes 5' are provided in series in outer cylinder 1 for movably receiving small pin-like permanent magnet pieces 5, respectively, inner cylinder 2 being rotatably fitted in cylindrical bore 3' in outer cylinder 1, a corresponding number of holes 5" being provided in the outer peripheral surface of inner cylinder 2 in alignment with said holes 5', respectively. Said small pin-like permanent magnet pieces 5 are located in respective holes 5' so as to be moved in the axial direction of holes 5' so that magnet pieces 5 can be moved in said holes 5" when inner cylinder 2 is rotated to the locking position in bore 3' of outer cylinder 1. The line designated by the reference numeral 3 in FIG. 1 is usually called "shear line." When magnet pieces 5 are in the positions shown in FIG. 1 wherein they extend in holes 5' and 5" across said shear line 3 when inner cylinder 2 is positioned in registry with outer cylinder in said bore 3', inner cylinder 2 is prevented from being rotated in said bore 3' by virtue of said magnet pieces 5 extending across said shear line 3. Therefore, in this position of inner cylinder 2, cylinder cam 7 fixedly secured to the end of inner cylinder 2 cannot be actuated thereby preventing the lock from being unlocked. FIG. 2 shows the lock in locked position wherein magnet pieces 5 extend across shear line 3 thereby preventing inner cylinder 2 from being rotated in bore 3' of outer cylinder 1. Key 10 for use with the lock shown in FIG. 3 is provided with a series of permanent magnet pieces 6 embedded therein in positions corresponding to those of holes 5", respectively, when key 10 is properly inserted into slot 10' in inner cylinder 2. The polarity of said magnet pieces 6 of key 10 designed to properly cooperate with the lock is selected in such a manner as shown in FIG. 5A. In FIG. 5A, six magnet pieces 6 of the key 10 are shown at positions A, B, C . . . , respectively. The polarity of each of the magnet pieces 6 is selected, for example, to be N–N–S–N–N–S at its upper side from the left of the set of magnetic pieces 6. If the magnet pieces 5 of the lock have their polarities selected to be N–N–S–N–N–S at their lower sides from the left of the set of magnetic pieces 5, respectively, then all of magnet pieces 5 are repeled to move upwardly from the positions shown in FIG. 1 to the positions shown in FIG. 3, thereby unlocking the lock. However, if another key which has its magnet pieces 6 arranged so that their polarities are, for example, N–S–S–N–S–S at their upper sides from the left of the set of magnet pieces 6, respectively, as shown in FIG. 5B, is inserted in the lock, then magnet pieces 5 shown at positions B and E in FIG. 5B are attracted by corresponding magnet pieces 6 at positions B and E so that they are left at the position of shear line 3, therefore, the lock cannot be unlocked.

Depending upon the number $n$ of magnet pieces 5 provided in the lock and the corresponding magnet pieces 6 of the key and the selection of the polarity of each of the magnet pieces, there can be provided 2 different combinations of key changes (different unlocking characteristics).

As shown in FIG. 1, bore 10′ in which the key is to be inserted has smooth inner surfaces, and shear line 3 cannot be sensed from the outside so as to detect the unlocking characteristics, and, further, it is difficult to find out how many magnet pieces are provided in the lock and in which polarity they are located. Therefore, it is absolutely impossible to unlock the lock improperly by "picking" operation. It suffices to utilize gravitational force without providing any spring means in order to return magnet pieces 5 in the tumbler lock to their locking position. Therefore, this embodiment of the magnet tumbler lock can avoid any trouble which might be caused by using spring means feasible to be broken by fatigue as was the case in prior art cylinder locks.

In prior art cylinder locks, the keys to be used with the cylinder locks are provided with surface irregularities for providing unlocking characteristics, therefore, the keys cannot be inserted in the locks smoothly. To the contrary, the key of the present invention, which has magnet pieces embedded therein, has smooth plain surfaces, thereby permitting the key to be inserted in the lock very smoothly. If plating is applied appropriately on the surface of the key, it makes it difficult to detect the magnet pieces in the key by visual inspection, therefore, the number of the magnet pieces and their polarity cannot easily be determined.

Figure 6:
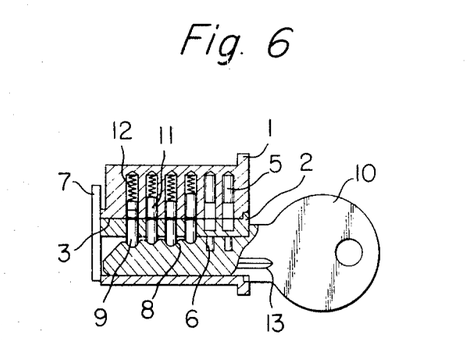
FIG. 6 shows a side view, partly in cross section, of a second embodiment of the magnet tumbler lock in accordance with the present invention in which the mechanism of the conventional pin-tumbler lock is used in combination with the magnetically actutated pins in accordance with the present invention.
Figure 7:
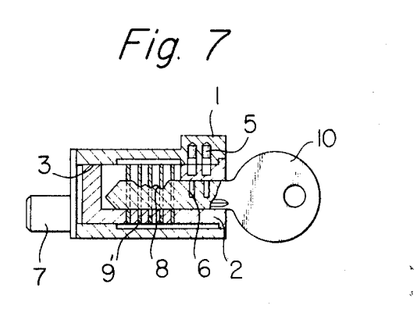
FIG. 7 shows a side view, partly in cross section, of the third embodiment of the present invention in which the mechanism of the conventional disc-tumbler lock is built in together with the pins magnetically actutated in accordance with the present invention.
Figure 8:
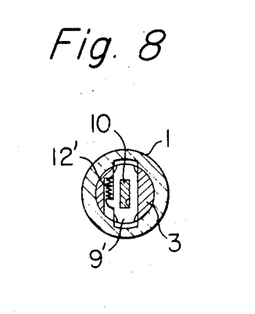
FIG. 8 is a cross sectional view taken in the plane perpendicular to that of FIG. 7.

Further, the present invention provides so-called magnetic pin-tumbler lock, magnetic disc-tumbler lock, or magnetic lever-tumbler lock by combining the construction of the magnet tumbler lock as described above with the construction of well known pin-tumbler lock, disc-tumbler lock, or lever-tumbler lock. As shown in FIG. 6 illustrating the second embodiment of the present invention, for example, one edge of key 10 is provided with a plurality of notches 8 serving as the key of conventional pin-tumbler lock while key 10 is provided with magnet pieces 6 embedded therein. Outer cylinder 1 and inner cylinder 2 are suitably provided with pin-tumblers, pins 9, drivers 11 and springs 12 are also built in adequately as in the case of conventional pin-tumbler lock. By the arrangement as described above, a number of key changes (different unlocking characteristics) can be obtained. The provision of a master key is made easy, thereby enabling many keys to be produced. This construction also provides a lock which absolutely cannot be unlocked by "picking" operation. The number of key changes can be increased by providing groove 13 on the surface of key 10 and making the cross section of the slot in the inner cylinder into which the key is to be inserted conform with the cross section of key 10 provided with said groove 13. As shown in FIGS. 7 and 8 illustrating the third embodiment of the present invention, one edge of key 10 is provided with a plurality of notches 8 serving as a key of conventional disc-tumbler lock, magnet pieces 6 are embedded in key 10, the construction of conventional disc-tumbler lock is provided appropriately in outer cylinder 1 and inner cylinder 2, and discs 9′ and springs 12′ are built in the lock, then a magnetic disc-tumbler lock is provided in which the construction of magnet tumbler lock of the present invention is combined with conventional disc-tumbler lock, thereby enabling a large number of key changes to be obtained.

Figure 9:
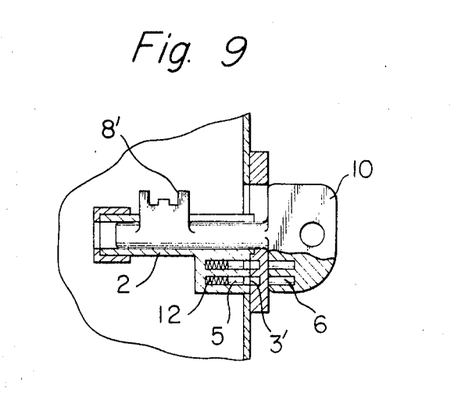
FIG. 9 shows a side view, partly in cross section, of the fourth embodiment of the present invention in which the mechanism of the conventional lever-tumbler lock is incorporated with the magnetically actuated pins in accordance with the present invention.

FIG. 9 shows the fourth embodiment of the combination of the construction of the magnet tumbler lock in accordance with the present invention with that of the conventional lever-tumbler lock. In this example, key 10 of the conventional lever-tumbler lock is provided with recesses in rectangular form adapted to cooperate with conventional lever-tumbler lock. Magnet pieces 6 are embedded in the head of key 10 parallel to the magnitudinal axis of the key as shown. Magnet pieces 5 are also built in the lock movably in the direction parallel to the axis of the key so as to cooperate with magnet pieces 6 of the key when key 10 is inserted in the lock. When the key is inserted in the lock, magnet pieces 5 are repelled by magnetic force effected by magnet pieces 6, when the polarity of both sets of magnet pieces 5 and 6 are properly oriented, thereby shifting magnet pieces 5 toward the left against the action of springs 12 so that magnet pieces 5 are moved out of shear line 3′ permitting inner cylinder 2 to be rotated. Thus, bit 8′ of key 10 pushes the lever-tumbler thereby unlocking the lock in the same manner as the conventional lever-tumbler lock.

Figures 10, 11:
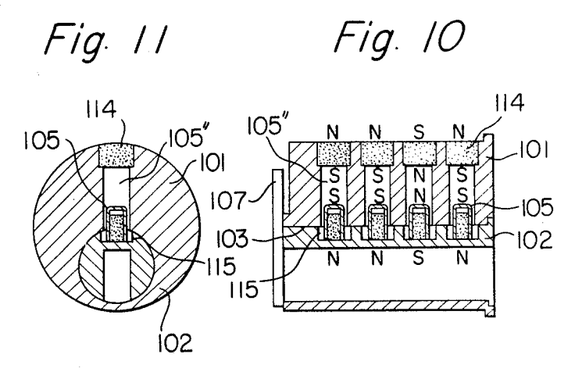
FIG. 10 shows a longitudinal section of the fifth embodiment of the magnet tumbler lock in accordance with the present invention in which permanent magnet pieces are built in for repelling the pins toward the locking position when the key is not inserted into the lock.
FIG. 11 is a cross sectional view taken in the plane perpendicular to that of FIG. 10.
Figure 12:
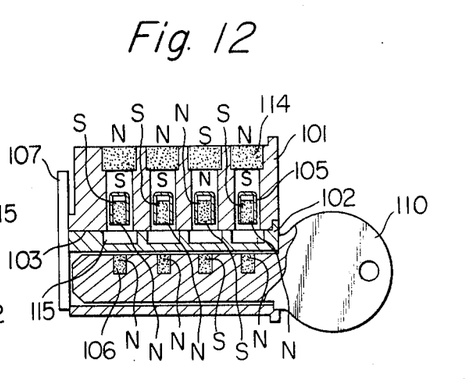
FIG. 12 shows a longitudinal section similar to FIG. 10 but showing the lock in unlocked position by inserting the key properly designed to be used with the lock into the lock.
Figure 13:
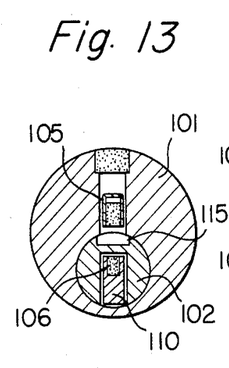
FIG. 13 is a cross sectional view taken in the plane perpendicular to the of FIG. 12.

FIGS. 10 and 11 show the fifth embodiment of the present invention. As shown in these drawings, repulsion permanent magnet pieces 114 are respectively secured at the ends of holes 105″ in outer cylinder 101 remote from the ends of holes 105″ adjacent to which ends recesses 115 in inner cylinder 102 are located for removably receiving pins 105 in each of which a permanent magnet piece is built in. If the polarity of each of said magnet pieces 114 is oriented in such a manner, as shown in FIG. 10, that the upper side of each of magnet pieces 114 is N–N–S–N from the left of the set of magnet pieces 114, the polarity of each of magnet pieces 114 at the lower side thereof is S–S–N–S from the left of the set. When the polarity of each of said permanent magnet pieces 105′ built in pins 105 is selected in such a manner that the upper side of each of the magnet pieces 105′ has S–S–N–S from the left of the set of pins 105, then pins 105 are repelled by the magnetic force acting between magnet pieces 114 and magnet pieces 105′ so that pins 105 are forced into recesses 115 of inner cylinder 102 without requiring any mechanical forces such as springs or gravity, thereby locating pins 105 across so-called shear line 103 so that inner cylinder 102 is prevented from being rotated. When a key 110 which has magnetic pieces 106 embedded therein corresponding in number and location thereof to those of pins 105 and having stronger magnetic force than magnetic pieces 114 is inserted in the lock as shown in FIGS. 12 and 13, and if the polarity of each of magnet pieces 106 is N–N–S–N at the upper side thereof from the left of the set of magnet pieces 106, then all the pins 105 are repelled by the magnetic forces acting between magnet pieces 105 and magnet pieces 106 thereby shifting magnet pieces 105 out of shear line 103 as shown in FIGS. 12 and 13. Thus inner cylinder 102 can be rotated and cam 107 secured to inner cylinder can actuate the lock mechanism to unlock the lock.

Figure 14:
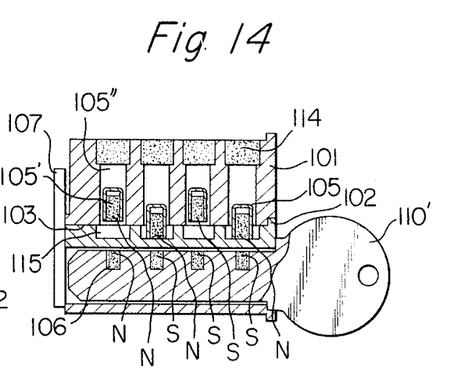
FIG. 14 shows a longitudinal sectional view similar to FIG. 10 but showing the lock with an improper key being inserted into the lock so that some of the magnetically actuatable pins cannot be moved to unlocking position thereby preventing the lock from being released.
Figure 15:
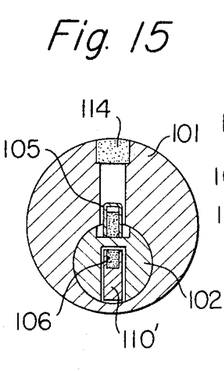
FIG. 15 is a cross sectional view taken in the plane perpendicular to that of FIG. 14.
Figure 16:
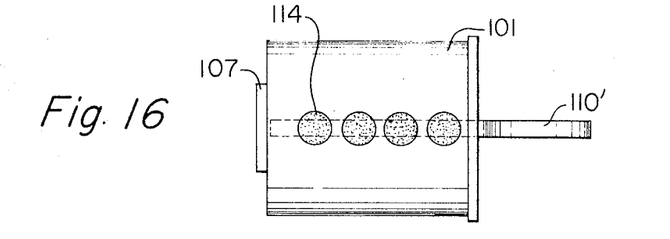
FIG. 16 is a plan view of FIG. 14.

If the key 110′ inserted into the lock is not the proper one which, as shown in FIGS. 14, 15 and 16, for example, has permanent magnet pieces 106 embedded therein the polarity of each of which is N–S–S–S at the upper side thereof from the left of the set of magnet pieces 106, then the second and the fourth pins 105 are attracted by magnet pieces 106 to move downward by the resultant magnetic force effected by magnet pieces 106 of key 110′ and repulsion magnet pieces 114 in outer cylinder 101 thereby locating said pins 105 across shear line 103 so that inner cylinder 102 cannot be rotated by key 110′.

Figure 17:
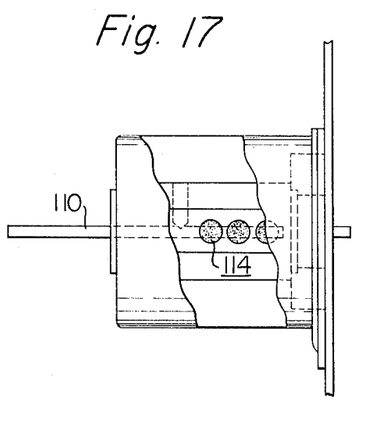
FIG. 17 is an elevational view of the sixth embodiment of the magnet tumbler lock in accordance with the present invention.
Figure 18:
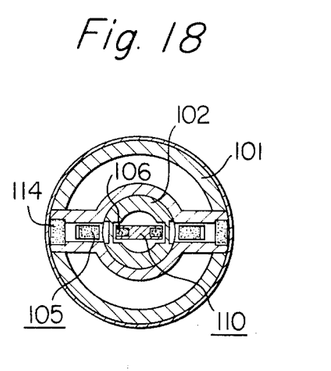
FIG. 18 is a cross sectional view taken in the plane perpendicular to that of FIG. 17.
Figure 19:
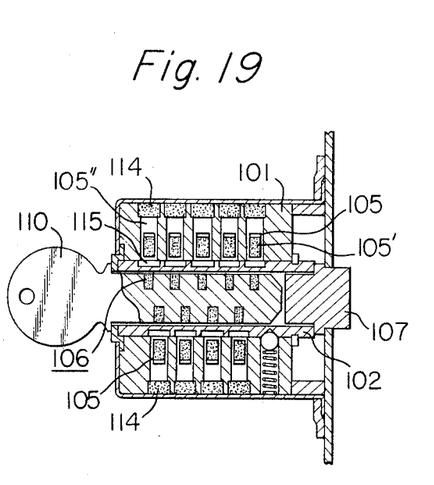
FIG. 19 is a horizontal longitudinal sectional view taken in the plane perpendicular to that of FIG. 17.

If proper key 110 is provided wtih total of nine permanent magnet pieces 106 at its upper and lower sides thereof as shown in FIGS. 17, 18 and 19 illustrating the sixth embodiment of the present invention, for example, and if total of nine repulsion permanent magnet pieces 114 are built in outer cylinder 101 at location corresponding to those of said magnet pieces 106, then the same unlocking action is achieved as in the case described above. And this construction provides a larger number of key changes.

Figure 20A:
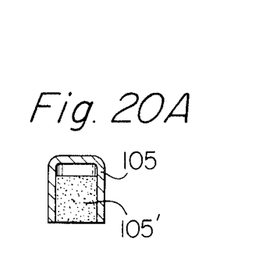
FIG. 20A is a longitudinal sectional view of the pin with the permanent magnet piece built therein in accordance with the present invention.
Figure 20B:
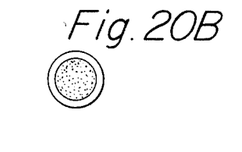
FIG. 20B is a cross section view taken in the plane perpendicular to that of FIG. 20A.

FIGS. 20A and 20B are enlarged detailed sectional views of a pin 105 with a permanent magnet piece 105' built therein. The pin itself may be made of a permanent magnet piece, but, in general, a permanent magnet having intense magnetic force is made of sintered alloy and the mechanical strength thereof is rather low and sometimes it is brittle, therefore, it is preferred to secure permanent magnet piece 105' within a tubular shell 105 made of metal or synthetic resin.

The above-mentioned embodiments are examples in which permanent magnet pieces 105 are mainly actuated by the repulsion forces acting between the same polarity of magnet pieces adapted to cooperate with each other. It is also possible to utilize attraction forces acting between opposite polarity of magnet pieces cooperating with each other so as to unlock the magnetic tumbler lock of the present invention.

Figure 21:
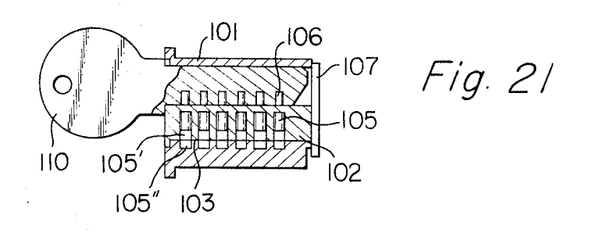
FIG. 21 shows a longitudinal sectional view of the seventh embodiment of the magnet tumbler lock in accordance with the present invention wherein the magnetically actuated pins in the lock are moved by magnetic attraction toward unlocking positions by inserting the key properly designed to be used with the lock.

In FIG. 21 showing seventh embodiment of the present invention, the lock comprises outer cylinder 101 and inner cylinder 102 rotatably fitted in said outer cylinder 101. Inner cylinder is provided with a series of holes 105' in the outer surface thereof with each of their axes being vertical as shown and a slot into which key 110 is adapted to be inserted. A plurality of pins 105 each comprising permanent magnet piece are movable provided in each of said holes 105. Outer cylinder 101 is also provided with holes 105" in the inner surface thereof, the position of each of holes 105" corresponding to that of each of said holes 105' in inner cylinder 102 when inner cylinder 102 is in the locked position. Pins 105 are normally held by the action of gravity in positions at which pins 105 extend both in holes 105' and 105" thereby preventing inner cylinder 102 to be rotated. Key 110 specifically for use with the lock is provided with the same number of permanent magnet pieces embedded therein, the positions thereof corresponding to those of holes 105' in inner cylinder 102 when the key is properly inserted in the lock. The orientation of the polarity of each of pins 105 is selected such that they are attracted by magnet piece 106 of key 110 when it is inserted to the lock thereby moving out from holes 105" in outer cylinder 101 so that inner cylinder 102 can be freely rotated to unlock the lock.

Figure 22:
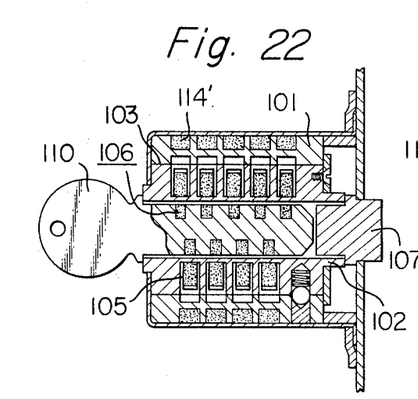
FIG. 22 is a modification of the lock shown in FIG. 21 wherein pins in the lock are normally held in locking positions by the attracting forces effected by attracting magnet pieces provided in the lock.
Figure 23:
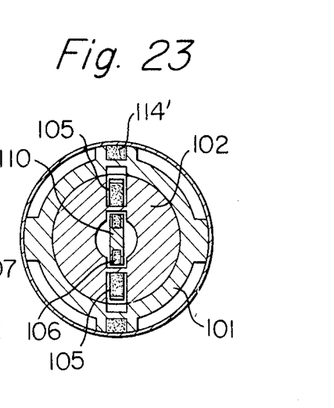
FIG. 23 is a cross sectional view taken in the plane of FIG. 22.

In FIGS. 22 and 23 which illustrate the modification of the lock shown in FIG. 21, total of nine pins 105 each having therein a permanent magnet piece are provided in inner cylinder 102, and total of nine attraction permanent magnet pieces 114' are provided in outer cylinder 101 at locations corresponding to those of pins 105 as shown in FIG. 22. In locked position of the lock, pins 105 are attracted by said attraction magnet pieces 114' so that pins 105 are located in positions across shear line 103 thereby preventing inner cylinder 102 from being rotated. Key 110 is provided with permanent magnet pieces 106 embedded therein, the number and location thereof corresponding to those of pins 105, said magnet pieces 106 having stronger magnetic forces than those of attraction permanent magnet pieces 114'. When key 110 is inserted into the lock as shown in FIG. 22, and if the polarity of magnet pieces 106 is properly oriented to actuate pins 105 in like manner described above, permanent magnet pieces 106 of key 110 attract pins 105 against the magnetic forces effected by attraction magnet pieces 114' so that pins 105 are moved inwardly of inner cylinder 102 thereby locating pins 105 out of shear line 103. Thus, key can be rotated together with inner cylinder 102 thereby unlocking the lock.

Figure 24A:
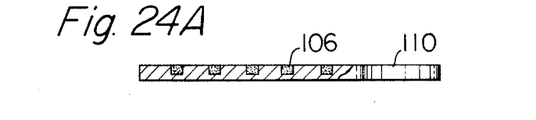
FIG. 24A shows a side view, partly in section, of a key to be used with further embodiment of the magnet tumbler lock of the present invention.
Figure 24B:
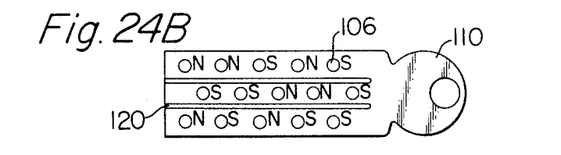
FIG. 24B is a plan view of the key shown in FIG. 24A.
Figure 25:
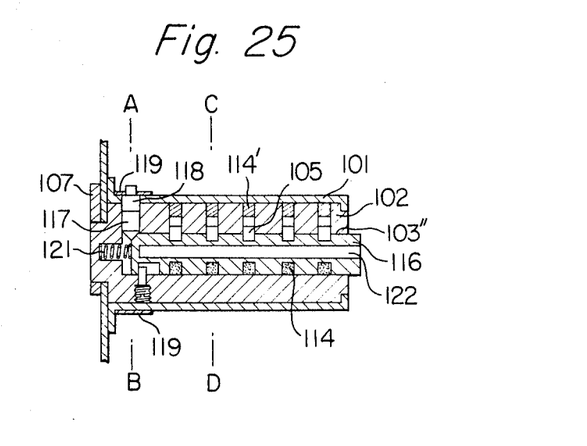
FIG. 25 is a longitudinal sectional view showing the magnetic tumbler lock to be used with the key shown in FIGS. 24A and 24B.
Figure 26:
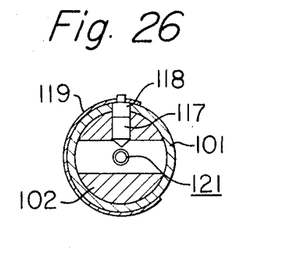
FIG. 26 is a cross sectional view taken in the plane A–B indicated in FIG. 25.
Figure 27:
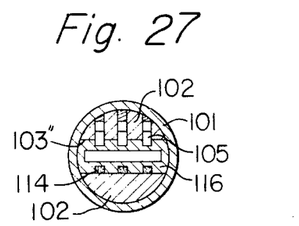
FIG. 27 is a cross sectional view taken in the plane C–D indicated in FIG. 25.

FIGS. 24A, 24B, 25, 26 and 27 show further embodiment of the present invention. In this embodiment, a plurality of permanent magnet pieces 106 are embedded in one surface of key 110 made of non-magnetizable material such as brass or aluminum as shown in FIGS. 24A and 24B, with the arrangement and polarity of said magnet pieces 106 being suitably selected so as to provide various combinations of key changes. The lock to be used with key 110 shown in FIGS. 24A and 24B is constructed as shown in FIG. 25, with movable pins 105 of permanent magnet located at positions corresponding to those of magnet pieces 106 of key 110 when the latter is inserted in slot 122 of auxiliary cylinder 116 of rectangular cross section provided in inner cylinder 102, said pins 105 being normally attracted by attraction permanent magnet pieces 114 provided in said auxiliary cylinder 116 in the side opposite to the side at which said pins 105 are located, so that pins 105 are normally in positions across shear line 103" thereby preventing auxiliary cylinder 116 from being shafted relative to inner cylinder 102. When the key 110 is inserted into slot 122 and if the polarity of magnet pieces 106 of key 110 is suitably oriented with respect to the polarity of pins 105, then all of pins 105 are repelled by said magnet pieces 106 against the attraction forces effected by attraction magnet pieces 114 so as to be moved upwardly out of shear line 103", so that auxiliary cylinder 116 of rectangular cross section can be shifted to the left against the action of spring 121 thereby forcing pin 117 which contacts by its tapered end with the beveled surface provided at the end edge of auxiliary cylinder 116 to be moved upwardly with the result that driver 118 located adjacent to said pin 117 is pushed outwardly against the section of leaf spring 119. When the upper surface of pin 117 reaches the outer peripheral surface of inner cylinder 102, driver 118 moves out of inner cylinder 102 and into the hole of outer cylinder 101 with the mating faces of pin 117 and driver 118 being flushed with the peripheral surface of inner cylinder 102. Thus, inner cylinder 102 can be rotated thereby permitting cam 107 to actuate the lock mechanism to unlock the lock. In this embodiment, a plurality of permanent magnet pieces 106 can be located in the broad surface of key 110 at any desired distance from each other and in any orientation of polarity of magnet pieces 106. In FIG. 24B, for example, the upper row of five magnet pieces 106 is arranged in such a manner that the polarity of each of magnet pieces 106 at the outer side is N–N–S–N–S from the left in the row, the polarity of each of five magnet pieces 106 in the intermediate row being S–S–N–N–S at the outer side thereof from the left in the row, the polarity of each of five magnet pieces 106 in the lower row being N–S–N–S–S at the outer side thereof from the left in the row. In such an arrangement $2^{15}$ of key changes can be obtained by merely changing the orientation of the polarity of any of magnet pieces 106. Further, by changing the distance between magnet pieces 106 and the distance between the rows of magnet pieces 106, an almost infinite number of key changes can be obtained. Furthermore, by providing grooves 120 in the surface of key 110 at appropriate location, the number of key changes can be further increased. In the embodiment as shown in FIG. 25, permanent magnet pieces 114 normally attract pins 105 to move them into positions at which auxiliary cylinder 116 is prevented from being shifted relative to inner cylinder 102. When a key 110 with magnet pieces 106 embedded therein in appropriate orientation of the polarity thereof is inserted in the lock, magnet pieces 106 repell said pins 105 against the attracting force effected by magnet pieces 114 so as to move pins 105 so that auxiliary cylinder 116 can be shifted relative to inner cylinder 102.

It must be noted that magnet pieces 114 may be replaced by repulsion magnet pieces 114' shown in FIG. 25 so that magnet pieces 114' normally repel pins 105 into locking position thereof.

Figure 28A:
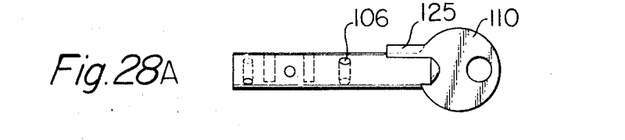
FIG. 28A is a plan view showing a key to be used with a still further embodiment of the magnet tumbler lock of the present invention.
Figure 28B:
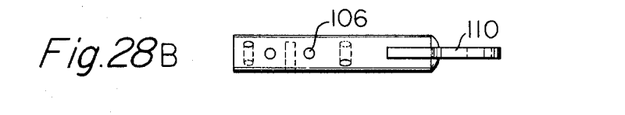
FIG. 28B is a plan view of the key shown in FIG. 28A.
Figure 29:
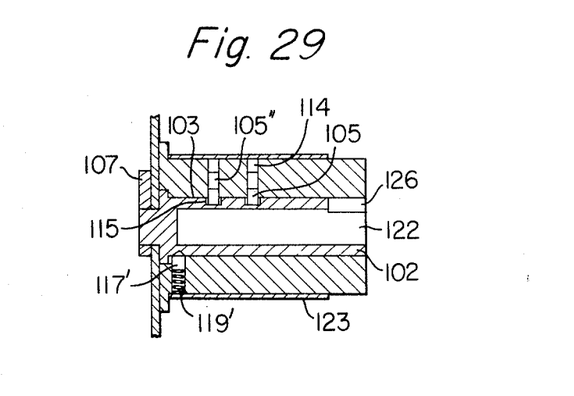
FIG. 29 is a longitudinal sectional view showing the eighth embodiment of the magnet tumbler lock to be used with the key shown in FIGS. 28A and 28B.
Figure 30:
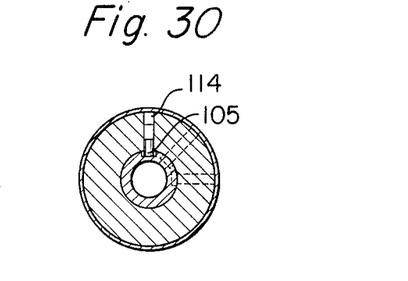
FIG. 30 is a cross sectional view taken in the plane perpendicular to that of FIG. 28.

FIGS. 28A and 28B which illustrate still further embodiment of the present invention show a key 110 in which a plurality of permanent magnet pieces 106 are embedded in the key stem of circular cross section at different positions lengthwise thereof each in radial direction of the cross section at different orientation. The polarity of each of said magnet pieces 106 can be altered, and the orientation of magnet pieces 106 can be selected at any direction within the range of 360°, and an extremely large number of key changes can be obtained by this embodiment. The lock to be used with key 110 as shown in FIGS. 28A and 28B is shown in FIGS. 29 and 30. Magnet pieces 105 are movably located in holes 105" in outer cylinder 101, respectively. Repulsion magnet pieces 114 weaker than magnet pieces 106 of key 110 are provided at the outer end of each of holes 105" so as to normally repel magnet pieces 105 so that the latter are received in recesses 115 of inner cylinder 102 thereby locating magnet pieces 105 across shear line 103 so as to prevent inner cylinder 102 from being rotated. When key 110 of FIGS. 28A and 28B is inserted into bore 122 of inner cylinder 102, and if the location and polarity of magnet pieces 106 of key 110 properly correspond to those of magnet pieces 105 so as to repel magnet pieces 105 to move them out of shear line 103 against the repelling forces effected by magnet pieces 114, then the lock can be unlocked by rotating inner cylinder 102 so that cam 107 is rotated to unlock the lock mechanism. Recess 126 provided at the outer end of bore 122 is adapted to receive projection 125 provided on key 110 when the latter is inserted into bore 110 to thereby rotate inner cylinder 102 together with rotation of key 110. Pin 117' and spring 119' are provided to located inner cylinder in proper position for locking. Pin 117' can be retracted against the force of spring 119' during the rotation of inner cylinder 102 in unlocked state thereof by virtue of tapered end of pin 117'. This cylindrical tube 123 located on the peripheral surface of outer cylinder 101 serves to maintain magnet pieces 114 as well as spring 119' in position. By varying the number and shape of recess 126 as well as those of projection 125, the number of key changes can be increased.

In FIG. 28, the key stem of key 110 is shown to have circular cross section; however, the cross section of the key stem can be made any regular or irregular polygonal form so as to fit the corresponding hole in the lock thereby dispensing with the provision of projection 125 and recess 126 for rotating inner cylinder 102 together with key 110.

As described above, a very useful and novel magnet tumbler lock is provided in accordance with the present invention by providing permanent magnet pieces in the lock and in the key with the polarity and location thereof selected appropriately.

In accordance with the present invention spring means for moving pins into locking position as required in conventional pin-tumbler lock can be dispensed with, attractive force and/or repelling force acting between the pins in accordance with the present invention and the permanent magnet pieces provided in the lock providing means for moving the pins into locking position, while the repelling force and/or attracting force acting between the pins and the permanent magnet pieces provided in the key serves to move the pins out of locking positions thereof. The lock of the present invention is very simple in construction and easy to manufacture, and is very stout and durable without any danger of fatigue failure, and provides an extremely large number of key changes. Further, the lock of the present invention absolutely cannot be unlocked without using the proper key designed to be used solely with the lock.

I claim:

1. In a lock and key combination wherein said key includes at least one permanent magnet key piece and said lock includes at least one movable magnetically actuatable member adapted to cooperate with said magnet piece to move by the magnetic force between said movable member and said magnet key piece from a locking position wherein said movable member extends across a shear line to an unlocking position wherein said movable member clears said shear line as said key is inserted into said lock, the improvement comprising:

attraction permanent magnet means poistioned in said lock and adapted to cooperate with said movable member to move it by the magnetic force between said magnet means and said movable member into said locking position whenever said key is removed from said lock;

said movable member being in the form of a permanent magnet;

the orientation of the polarity of said magnet key piece being specifically selected with respect to the orientation of the polarity of said movable member so that said movable member is repelled by said magnet key piece by the magnetic forces acting therebetween, to move said movable member from its normal locking position to said unlocking position upon insertion of said key into position in said lock thereby enabling said lock to be unlocked;

said lock including an inner body member movable relative to an outer body member with a first shear line separating said inner and outer body members;

said outer member defining a hole communicating with said shear line adapted to bodily hold said movable magnet member clear of said shear line;

said inner member defining a recess for communicating with said first shear line and said hole defined in said outer member for accommodating a portion of said movable magnet member, leaving a portion thereof extending across said first shear line;

said inner member also defining a key chamber into which said key is inserted for positioning said magnet key piece relative to said movable magnet member to magnetically force its movement from within said recess bodily and totally into said hole upon insertion of said key into said key chamber for clearing said first shear line and thereby permitting relative movement between said inner and outer body members of said lock;

said lock including an outer casing surrounding said outer body member with a second shear line defined therebetween;

pin means positioned in sliding contact with said inner body member of said lock and mounted to move a driver member adjacent to said pin radially outwardly from said inner body member when said inner body member moves relative to said outer body member camming said pin and driver members in said outward movement until the third shear line defined between said pin and its adjacent driver is coincident with said second shear line; and said outer casing defining an aperture through which said driver member may pass as it is actuated by said pin member to thereby permit relative movement between said outer casing and said outer body member of said lock.

2. The combination of a lock and a key to be specifically used with said lock wherein permanent magnet pieces are provided in the key, which magnet pieces are adapted to actuate magnetically actuatable members movably built in the lock so as to move them from their normal locking positions to unlocking positions by the magnetic forces acting between said permanent magnet pieces in said key and said magnetically actuatable members in the lock, when the key is inserted in the hole of the lock, the improvement comprising the fact that:

the aforesaid magnetically actuatable members in said lock each comprise a permanent magnet piece, the orientation of the polarity of which is selected in such a manner with respect to the orientation of the polarity of the corresponding permanent magnet piece in said key that the former is repelled by the latter by the magnetic force acting therebetween so as to move said member in the lock from its normal locking position to unlocking position upon insertion of the key in position in the hole of the lock, thereby enabling the lock to be unlocked;

said lock comprises an inner cylinder rotatably fitted in an outer cylinder of the lock;

said key is formed in plate-like shape;

said permanent magnet pieces in the key being embedded in the broad surface of said key;

the number, the arrangement and the orientation of the polarity of said permanent magnet pieces in the key corresponding to those of the movable magnet members in said lock so as to move the latter to unlocking positions when the key is inserted in position in the lock;

there being auxiliary permanent magnet pieces in the lock, and said magnet members in the lock being normally held to extend into recesses of an auxiliary cylinder shiftably located in said inner cylinder rotatably fitted in the outer cylinder of the lock, by the magnetic forces of the auxiliary permanent magnet pieces provided in the lock so as to maintain said magnet members in locking position;

said magnetic forces acting between said movable magnet members and said auxiliary permanent magnet pieces, being overcome by the repulsion magnetic forces acting between said magnet members and said permanent magnet pieces in the key when the latter is inserted in position in the hole in said auxiliary cylinder so as to move said movable magnet members out of said recesses in the auxiliary cylinder to unlocking positions, thereby allowing said auxiliary cylinder to move relative to said inner cylinder, thereby moving a radially movable pin provided in the inner cylinder radially outwardly together with a driver provided in the inner cylinder adjacent to said pin, by virtue of the engagement of a conically pointed top end of the pin with a beveled surface of the auxiliary cylinder, thereby shifting the mating surfaces of the pin and the driver to a position flush with the shear line defined by the inner surface of the outer cylinder and the outer surface of the inner cylinder so that the inner cylinder is allowed to be rotated, thereby enabling the lock to be unlocked;

said driver and said pin in the inner cylinder being normally biased radially inwardly by spring means so as to maintain said inner cylinder in a locked position by virtue of said driver being held in a position extending across said shear line.

References Cited

UNITED STATES PATENTS

| | | | |
|---|---|---|---|
| 1,172,203 | 2/1916 | Fuller | 70—276 |
| 2,116,965 | 5/1938 | Schoorel et al. | 70—38 |
| 2,393,428 | 1/1946 | Stroud | 70—276 |
| 2,769,873 | 11/1956 | Noregaard | 335—207 |
| 2,931,953 | 4/1960 | Barney | 317—134 |
| 3,111,834 | 11/1963 | Felson | 70—276 |
| 3,416,336 | 12/1968 | Felson | 70—276 |
| 3,444,711 | 5/1969 | Sedley | 70—276 |

RICHARD E. MOORE, Primary Examiner

R. L. WOLFE, Assistant Examiner

U.S. Cl. X.R.

70—356, 360, 413, 421